(12) United States Patent
Geller et al.

(10) Patent No.: US 10,735,818 B2
(45) Date of Patent: Aug. 4, 2020

(54) GENERATION OF TASK RECORDS BASED ON CONTEXT OF TASK GENERATION REQUEST

(71) Applicant: R3 Collaboratives, Inc., San Francisco, CA (US)

(72) Inventors: Adam Joseph Geller, San Francisco, CA (US); Ross David Weldon, Walnut Creek, CA (US); Benjamin John Tomassetti, San Francisco, CA (US)

(73) Assignee: R3 Collaboratives, Inc., San Francisco, CA (US)

( * ) Notice: Subject to any disclaimer, the term of this patent is extended or adjusted under 35 U.S.C. 154(b) by 11 days.

(21) Appl. No.: 16/019,313

(22) Filed: Jun. 26, 2018

(65) Prior Publication Data
US 2018/0376211 A1 Dec. 27, 2018

Related U.S. Application Data

(60) Provisional application No. 62/525,641, filed on Jun. 27, 2017.

(51) Int. Cl.
| | |
|---|---|
| H04N 21/4725 | (2011.01) |
| H04N 21/4788 | (2011.01) |
| H04N 21/472 | (2011.01) |
| H04N 21/8405 | (2011.01) |
| H04N 21/47 | (2011.01) |
| H04N 21/4722 | (2011.01) |
| H04N 21/475 | (2011.01) |

(52) U.S. Cl.
CPC ......... *H04N 21/4725* (2013.01); *H04N 21/47* (2013.01); *H04N 21/472* (2013.01); *H04N 21/4722* (2013.01); *H04N 21/4751* (2013.01); *H04N 21/4756* (2013.01); *H04N 21/4758* (2013.01); *H04N 21/4788* (2013.01); *H04N 21/47205* (2013.01); *H04N 21/8405* (2013.01)

(58) Field of Classification Search
None
See application file for complete search history.

(56) References Cited

U.S. PATENT DOCUMENTS

| | | | | |
|---|---|---|---|---|
| 8,806,320 | B1 * | 8/2014 | Abdo | G06F 17/2235 715/203 |
| 2012/0288843 | A1 * | 11/2012 | Shaffer | G09B 7/02 434/350 |
| 2015/0223051 | A1 * | 8/2015 | Nadgir | H04W 8/186 455/435.1 |

* cited by examiner

*Primary Examiner* — Justin E Shepard
(74) *Attorney, Agent, or Firm* — Elliot H. Karlin; Hickman Palermo Becker Bingham LLP

(57) ABSTRACT

In an embodiment, a data processing method comprises a first computer obtaining access to a digitally stored content item, the content item being stored with content item metadata identifying one or more of a creator of the content item, a title of the content item, description of the content item, content type of the content item, sharing settings of the content item, a taxonomy of the content item, or a category type of the taxonomy of the content item; receiving, at the first computer, a request to generate a task related to the content item; generating and storing a task record based, at least in part, on the content item metadata, the task record comprising an identifier of the task and the identifier of the content item; and causing display, on a second computer, a graphical representation of the task based, at least in part, on the task record.

20 Claims, 9 Drawing Sheets

GENERATION OF TASK RECORDS BASED ON CONTEXT OF TASK GENERATION REQUEST

BENEFIT CLAIM

This application claims the benefit under 35 U.S.C. § 119 of prior provisional application 62/525,641, filed Jun. 27, 2017, the entire contents of which are hereby incorporated by reference as if fully set forth herein.

FIELD OF DISCLOSURE

The present disclosure generally relates to creating, storing, and displaying task items based on a context of a request to generate the task item. The disclosure relates more specifically to improved techniques for association of comment record data or content item metadata with a generated task.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computer-based systems and applications permit playing videos and entering comments on the videos. For example, the YouTube service enables registered users to create and store comments that are associated with stored videos. However, current methods for generating action items based on video comments are insufficient. For instance, if a video comment provides an insight into an action for a user to take, there is no way for the commenter or the video author to generate a task for acting upon that method. The user would have to open up a separate application to generate tasks and reminders.

Additionally, there is no adequate means for automatically generating elements of a task based on comments or content items. Thus, the number of actions required by a computing device to generate tasks may be increased as there is no way to retrieve data based on the context of a request to generate a task.

Thus, there is a need for a system which can generate task records which include data retrieved from a comment record or content item metadata.

SUMMARY

The appended claims may serve as a summary of the invention.

DETAILED DESCRIPTION

Figure 1:
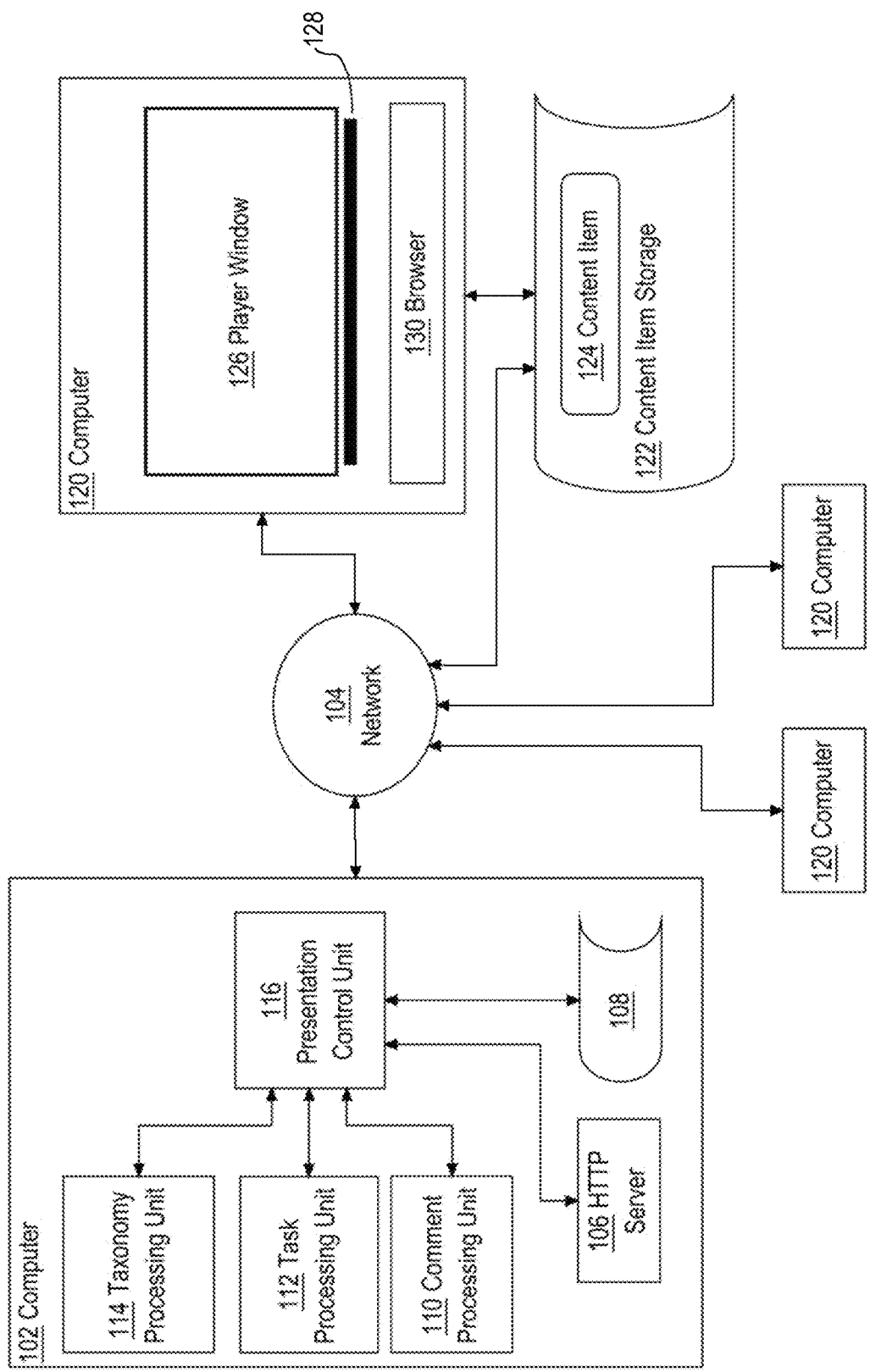
FIG. 1 illustrates an example networked computer system with which an embodiment may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1.0 General Overview

The disclosure encompasses various embodiments including those of the following enumerated clauses:

1. A data processing method comprises a first computer obtaining access to a digitally stored content item, the content item being stored with content item metadata identifying one or more of a creator of the content item, a title of the content item, description of the content item, content type of the content item, sharing settings of the content item, a taxonomy of the content item, or a category type of the taxonomy of the content item; receiving, at the first computer, a request to generate a task related to the content item; generating and storing a task record based, at least in part, on the content item metadata, the task record comprising an identifier of the task and the identifier of the content item; causing display, on a second computer, a graphical representation of the task based, at least in part, on the task record; wherein the method is performed using one or more processors.

2. The method of claim 1, further comprising: storing, at the first computer, a comment record comprising an identifier of the content item and comment input data; causing displaying, on a third computer, the content item and a comment item comprising the comment input data and an option to generate a task from the comment item; receiving a selection of the option to generate a task from the comment item and, in response, generating the task record, wherein the task record is further generated to comprise the comment input data based, at least in part, on the selection of the option to generate the task from the comment item.

3. The method of claim 2, further comprising: storing, in the comment record, an identifier of a taxonomy for the comment item; in response to the identifier of the taxonomy for the comment item being stored in the comment record, storing the identifier of the taxonomy for the comment item in the task record.

4. The method of claim 3 wherein the taxonomy is any of a framework and a rubric configured for use in evaluating an effectiveness of an educator.

5. The method of claim 2, further comprising: storing, in the comment record, a category type of a taxonomy for the particular comment item; in response to the category type of the taxonomy for the particular comment item being stored in the first record, storing the category type of the taxonomy for the particular comment item in the task record.

6. The method of claim 2, further comprising: determining that the comment record does not comprise data identifying a category type of a taxonomy for the particular comment item; identifying a second comment record comprising an identifier of the content item and a particular category type of a taxonomy for the second comment item; in response to the comment record not comprising data identifying a category type of a taxonomy for the particular content item, storing the particular category type for the second comment item in the task record.

7. The method of claim 2, wherein generating the task record comprises: executing one or more rules to identify data from one or more of the content item metadata or the comment record for populating one or more fields in the task record; populating the one or more field in the task record with the identified data; manipulating the data in the one or more fields for display in the graphical representation of the task on the second computing device or for storage in the task record.

8. The method of claim 7: wherein executing the one or more rules to identify data from one or more of the content item metadata or the comment record comprises: determining whether the comment record comprises a category type of a taxonomy for the particular comment item; in response to determining that the comment record comprises a category type, selecting the category type from the comment record for a title data field of the task record; in response to determining that the comment record does not comprise a category type of a taxonomy, determining whether the content item metadata comprises a category type of a taxonomy for the particular content item; in response to determining that the content item metadata comprises a category type, selecting the category type from the content item metadata for the title data field; in response to determining that the content item metadata does not comprise a category type, selecting a title of the content item from the content item metadata as for the title data field; wherein manipulating the data in the one or more fields comprises generating a title based on the title data field and a source of data in the title data field.

9. The method of claim 2, further comprising: causing displaying, on the second computer, a task generation interface comprising a plurality of editable options; prepopulating one or more of the plurality of editable options with the comment input data and the identifier of the content item; receiving additional task input data and a request to generate the task from the second computer and, in response, generating and storing the task record, the task record additionally comprising the additional task input data.

10. The method of claim 9, further comprising: determining that the comment record does not comprise data identifying a category type of a taxonomy for the particular comment item; identifying a plurality of second comment records comprising an identifier of the content item, comment input data for a plurality of second comment items, and a plurality of taxonomies or category types of a taxonomy for the plurality of second comment items; displaying, in the task generation interface, a plurality of selectable options, each of which corresponding to a taxonomy of the plurality of taxonomies or category type of the plurality of category types of the taxonomy; receiving a selection of a particular selectable option corresponding to a particular taxonomy and category type and, in response, storing the taxonomy and category type of the taxonomy for the particular comment item in the task record.

11. The method of claim 2, wherein receiving the comment input data comprises any of text, image, a video resource or video file, or an audio resource or audio file.

2.0 Structural and Functional Overview

FIG. 1 illustrates an example networked computer system with which an embodiment may be implemented.

In an embodiment, a first computer 102 is coupled to one or more second computers 120 directly or indirectly via one or more networks 104. In general, first computer 102 acts as an application server and the second computers 120 are clients. For purposes of illustrating a clear example, a limited number of second computers 120 are shown in FIG. 1, but in other embodiments an arbitrary number of second computers may be used. Network 104 broadly represents one or more of a LAN, WAN, internetwork, or internet and may include the public internet.

Computer 120 executes or hosts a browser 130, which may display one or more static and/or dynamic HTML documents and other data that the browser is capable of receiving over a protocol such as HTTP and rendering in a display unit of the computer 120. In an embodiment, as further described in other sections herein, browser 130 receives HTML documents and related data from computer 102 and renders a player window 126 in a display unit of the computer 120. In an embodiment, a linear graphical timeline 128 is also rendered in the display unit near the player window 126.

Computer 120 also is coupled to content item storage 122, which contains a content item 124. Content item 124 may include an image, a set of images, textual data such as text documents, audio data, such as a podcast, audiovisual data, and/or a set of content items, such as a bundle of video programs. In various embodiments, content item storage 122 is locally coupled to computer 120, or the content item storage is coupled to the network 104 and may not be owned or operated by the owner or operator of the computer 120. For example, content item storage 122 could be a video storage site that is accessible via the public internet and located in a third party data center, cloud service provider, or part of a third party commercial service. Content item storage 122 also could be owned, operated, managed or maintained by an institution, such an enterprise, a government entity such as a school district or county board of education, or any other suitable entity. In some embodiments, content item storage 122 may be co-located with computer 102, and owned or operated by the same entity that controls the computer 102.

Computer 102 comprises, in one embodiment, an HTTP server 106 and storage 108 coupled to a presentation control unit 116. A comment processing unit 110, task processing unit 112, and taxonomy processing unit 114 are coupled to the presentation control unit 116. In an embodiment, the HTTP server 106 is configured to serve static and/or dynamic HTML documents, and other content or data that can be served over HTTP, via network 104 to a compatible client such as browser 130 of computer 120. Storage 108 comprises a relational database, object database, and/or file server and/or other data repository for files and data that are used transiently or persistently by the other elements of computer 102.

In an embodiment, the comment processing unit 110 is configured to receive comment types and comment text, or other comment data items, associated with comments on a content item, such as content item 124 and to associate and store the comment types and comment text in storage 108 in a record that identifies the content item program. Specific techniques for performing these functions are further described in other sections herein.

In an embodiment, the task processing unit 112 is configured to generate task records based on content item metadata and/or comment records. Specific techniques for performing these functions are further described in other sections here.

In an embodiment, taxonomy processing unit 114 is configured to manage one or more taxonomies, each having a plurality of categories, and to receive taxonomy input that identifies a taxonomy and a category with which the content item 124 is associated. Specific techniques for performing these functions are further described in other sections here.

In an embodiment, presentation control unit 116 is configured to control interactions of the computer 120 with other elements of computer 102 and to implement applications, services, or features of a video program commenting service. For example, presentation control unit 116 may be configured to manage user accounts, receive and cause authentication of user security credentials, receive and store metadata relating to particular videos, control the taxonomy processing unit 114 to obtain a definition of one or more taxonomies and categories for association with the content item 124, control the comment processing unit to respond to requests to associate user comments with records in the storage 108, and control the task processing unit 112 to respond to requests to generate tasks and to obtain, process, and/or manipulate content item metadata and/or comment data for use in generating the tasks. Specific techniques for performing these functions are further described in other sections here.

In an embodiment, each of the processes described in connection with the functional units of FIG. 1 may be implemented using one or more computer programs, other software elements, and/or digital logic in any of a general-purpose computer or a special-purpose computer, while performing data retrieval, transformation and storage operations that involve interacting with and transforming the physical state of memory of the computer. The disclosure herein is directed to computer implementations of the processes, functions and functional units described herein, and the disclosure is not intended to preempt the use of other practical implementations of the processes and functions herein using means other than computers.

Figure 2B:
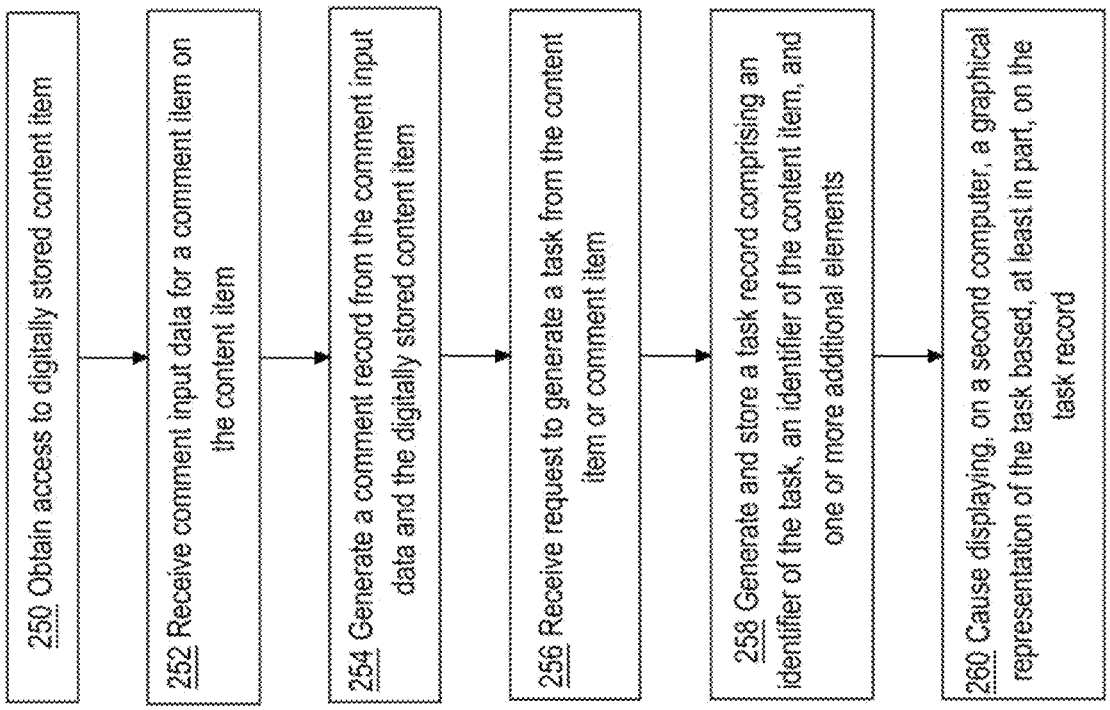
FIG. 2B illustrates an example data processing method according to an embodiment.
Figure 2A:
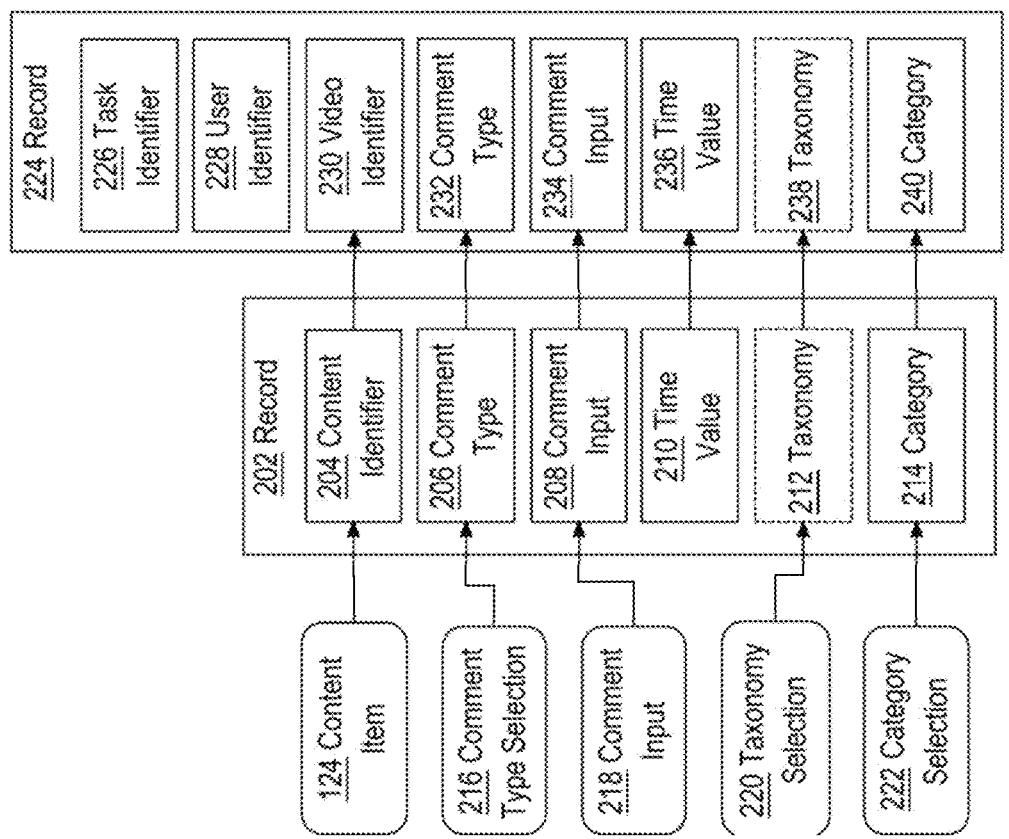
FIG. 2A illustrates example data sources and example database records.

FIG. 2A illustrates example data sources and example database records. In an embodiment, as outlined above and as described in more detail in other sections herein, a database record 202 is formed on the basis of obtaining or receiving information about a content item 124, comment type selection 216, comment input 218, a taxonomy selection 220, and a category selection 222 indicating a particular category within a taxonomy identified by the taxonomy selection. Using the processes that are described in more detail herein, data values from these input sources are associated in the database record 202. In one embodiment, the record 202 comprises a row in a relational database, but in other embodiments, the data shown in FIG. 2A may be configured using a plurality of tables, in a graph, or in other forms of data representation.

In an embodiment, database record 202 comprises and associates a content identifier 204, comment type 206, comment input 208, time value 210, and category 214; optionally, the record also may include an identifier of a taxonomy 202. In one embodiment, the content identifier 204 uniquely identifies a particular content item 124. The particular technique used to generate content identifier 204 is not critical; in one embodiment, for example, the presentation control unit 116 is configured with a base or seed identifier value, which is increased monotonically as users register content items in the system, as further described.

In an embodiment, comment type 206 specifies a particular comment type from among a plurality of available comment types. The particular available comment types may vary in various embodiments. For example, in an embodiment in which the system is configured to receive comments about a video showing a presentation, comment types may include: Questions, Suggestions, Strengths, Notes. Other embodiments that are used for other purposes may have other comment types.

In an embodiment, comment input 208 comprises text expressing a comment about a particular scene, topic, location, or occurrence within the content item 124. In some embodiments, comment input may include rich formatted text, or text with encodings that are used in rendering the comment according to particular type fonts or styles. In some embodiments, comment input at block 218 may comprise a video file, an audio track, or other audiovisual input that the user records at the time of commenting on another video, or obtains from storage and associates with the record 202. In an embodiment, the time value 210 indicates a playback time point in the content item 124 with which the comment input 208 is associated. The time value 210 may be automatically calculated in response to an input signal from the user, as further described herein, or entered explicitly.

In an embodiment, the category 214 identifies a category in a taxonomy. For example, in educational applications, the taxonomy may be a framework or rubric specifying good education practices, which has been developed by a particular organization or entity, and the techniques herein enable coding videos against such frameworks or rubrics to help measure conformance or performance in relation to the specified framework or rubric. In an embodiment, a name of the taxonomy and permitted categories are stored in storage 108. In some embodiments, the record 202 also may include an identifier of the taxonomy 212, or there may be a single implicit taxonomy.

FIG. 2B illustrates an example data processing method according to an embodiment. In an embodiment, each of the functions described in connection with the blocks of FIG. 2B may be implemented using one or more computer programs, other software elements, and/or digital logic in any of a general-purpose computer or a special-purpose computer, while performing data retrieval, transformation and storage operations that involve interacting with and transforming the physical state of memory of the computer. The disclosure herein is directed to computer implementations of the processes, functions and functional units described herein, and the disclosure is not intended to preempt the use of other practical implementations of the processes and functions herein using means other than computers.

For purposes of illustrating a clear example, the description of FIG. 2B is given with reference to FIG. 1, FIG. 2A. Other embodiments may be implemented in other contexts.

Additionally, FIG. 2B represents one example method comprising the generation of a task record based on a comment record. In other embodiments, the task record may be generated based on content item metadata without the comment record.

At block 250, the process obtains access to a digitally stored content item. The digitally stored content item may include an image, a set of images, textual data such as text documents, audio data, such as a podcast, audiovisual data, and/or a set of content items, such as a bundle of video programs. The digitally stored content item may include content item metadata which comprises data describing the content item. The content item metadata may include one or more of a title of the content item, an identifier of the creator of the content item, an identifier of a taxonomy, a category within a taxonomy of the content item, or any other data relating to the content item.

In an embodiment, block 250 involves receiving user input specifying a networked storage location of a particular video. The input may specify a URL for a video that is available in an online resource, and block 250 may involve accessing the URL and downloading a copy of the video or activating streaming delivery of a video stream that represents the program.

At block 252, the process receives comment input data for a comment item on the content item. The comment input data may include any of text, a video resource or video file, or an audio resource or audio file. The comment input data may be received through an editable text box, an uploaded file, or selection of one or more options on a graphical user interface. In an embodiment, the comment input data is received with comment type data indicating a type of comment. The comment type data may further define the comment, such as indicating whether the comment is a suggestion, question, or strength. Selection of a comment type may be performed through input indicating selection of a tab in a graphical user interface, a radio button, or other GUI widget that specifies a type of comment to use for a comment.

The comment input data may additionally be accompanied by a taxonomy selection, a category selection within the taxonomy, and/or input identifying location within the content item with which the comment is to be associated. Taxonomy data, such as the taxonomy and/or category of the taxonomy, may be supplied at the time of creation of the comment, implicitly supplied through connection to the content item, and/or supplied after the creation of the comment.

Location input may be specified as a location within an image and/or time within audio or audiovisual content. For example, receiving location input may involve the browser 130 detecting input from a keyboard, pointing device, or touchscreen of the second computer 120 at a position associated with pausing the video or signaling a comment. In one embodiment, the input is a click, tap, touch or other signal on the play head icon of the timeline 128; this input means, in effect, "Enter a comment for this point in the video." Alternatively, the input may be a click, tap, touch or other signal indicating selection of a button, icon or other user interface widget associated with a prompt such as "Leave comment now" or a similar message. In an embodiment, receiving location input comprises receiving a time value indicating a playback time in the video at which the input was received; the time value may be determined by the browser-executable code at the second computer and provided in a response or post, using HTTP or another protocol, back to the first computer. Location input may additionally include physical locations on visual content, such as a video or image. For instance, a comment may be received with input drawing a circle around a section of a video during a particular time period of the video. The location input may include the location of the drawn circle as well as the particular time period of the video.

At block 254, the process generates and stores a comment record associating the identifier of the video program and the comment text. Optionally, the comment type, time value, taxonomy, and/or category type of the taxonomy also may be stored in the record at block 254. In some embodiments, block 254 may comprise receiving a recording of audio or video representing a comment, rather than text, and associating the recording with the video program. For example, in some embodiments block 252 may be arranged to cause a graphical user interface to prompt or permit the user to record video via an attached webcam and microphone, store and upload the video, and then associate the new video as an annotation related to a specific moment in time with respect to the video program.

At block 256, the process receives a request to generate a task from the content item or comment item. Receiving the request to generate the task may comprise receiving a selection of a graphical element on or about a displayed content item or on or about a displayed comment item. In an embodiment, a graphical user interface element for generating a task may be displayed through a graphical user interface regardless of whether a content item or comment is being viewed. The process may determine, upon receiving a selection of the graphical user interface element for generating the task, whether a content item is being viewed. If the process determines that the content item is being viewed, the process may generate the task record using content item metadata. Additionally or alternatively, if the process determines that a comment item is being viewed, the process may generate the task record using the comment record.

At block 258, the process generates and stores a task record comprising an identifier of the task, an identifier of the content item, and one or more additional elements from the content item metadata or the comment record. For example, if the process receives a request to generate the task record from a comment item, the process may include data from the comment record in the task record. The data may include the comment type, the comment input, the time value, the taxonomy, and/or the category type of the taxonomy. The process may additionally or alternatively use content item metadata to generate the task record. For example, the process may identify a video title, an author of the video, a taxonomy for the video, and/or a category type of the taxonomy for the video and store the identified data in one or more fields of the task record.

In an embodiment, the process further comprises executing one or more rules to identify data from one or more of the content item metadata or the comment record for populating one or more fields in the task record. For example, when generating a title for the task record, the process may first determine whether a comment record includes an identifier of a category type of the taxonomy. If the comment record includes a category type of the taxonomy, the process may use the category type of the taxonomy from the comment when creating the title for the task record regardless of whether the content item includes a category type of the taxonomy. If the comment record does not include a category type of the taxonomy, the process may determine whether the content item metadata includes a category type of the taxonomy. If the content item metadata includes a category type of the taxonomy, the process may use the category type of the taxonomy from the content item when creating the title for the task record. If the content item metadata also does not include a category type of the taxonomy, the process may use the content item title when creating the title for the task record.

The task record may additionally include a task identifier 226 and a user identifier 228. The user identifier may comprise an identifier of the creator of the content item and/or an identifier of the user that requested generation of the task. The task identifier may include a title for the task and/or a unique identifier of the task generated by the computer 102 in response to receiving the request to generate the task.

At block 260, the process causes displaying, on a second computer, a graphical representation of the task based, at least in part, on the task record. In an embodiment, the process causes displaying of the task on a computing device of a user for whom the task was created. For example, if the task was created based on video content, the graphical representation of the task may be displayed on a computer of an author of the video content.

Displaying the task may comprise displaying one or more task fields that are prepopulated based on one or more of the content item metadata or the comment record. Additionally or alternatively, data in one or more fields of the task may be manipulated for display of the graphical representation of the task. For example, the process may include a first display of a field stating "Working on Category type of the taxonomy A from Taxonomy Name" if the title is being generated from a category type of the taxonomy, but include a display stating "Relates to Comment by UserName on VideoName" if the title is being generated from the content item metadata and the task was generated from a comment item.

In an embodiment, the graphical representation of the task comprises a graphical representation of an editable task proposal. For example, the process may cause display of a graphical user interface comprising editable text boxes, drop-down menus, selectable options, and/or options for uploading content. One or more elements of the graphical user interface may be prepopulated based on the content item metadata and/or comment metadata. For example, the process may input comment text into an editable text box for a description field in the graphical user interface. If the task is not related to a comment, the process may leave the description field blank and/or determine text for the editable text box based on available data. For instance, if the content item metadata includes a category type of the taxonomy, the editable text box may include text stating "Task relating to Category type of the taxonomy A on VideoName proposed by UserName."

3.0 Example Graphical User Interface

3.1 Options for Generating a Task

Figure 3:
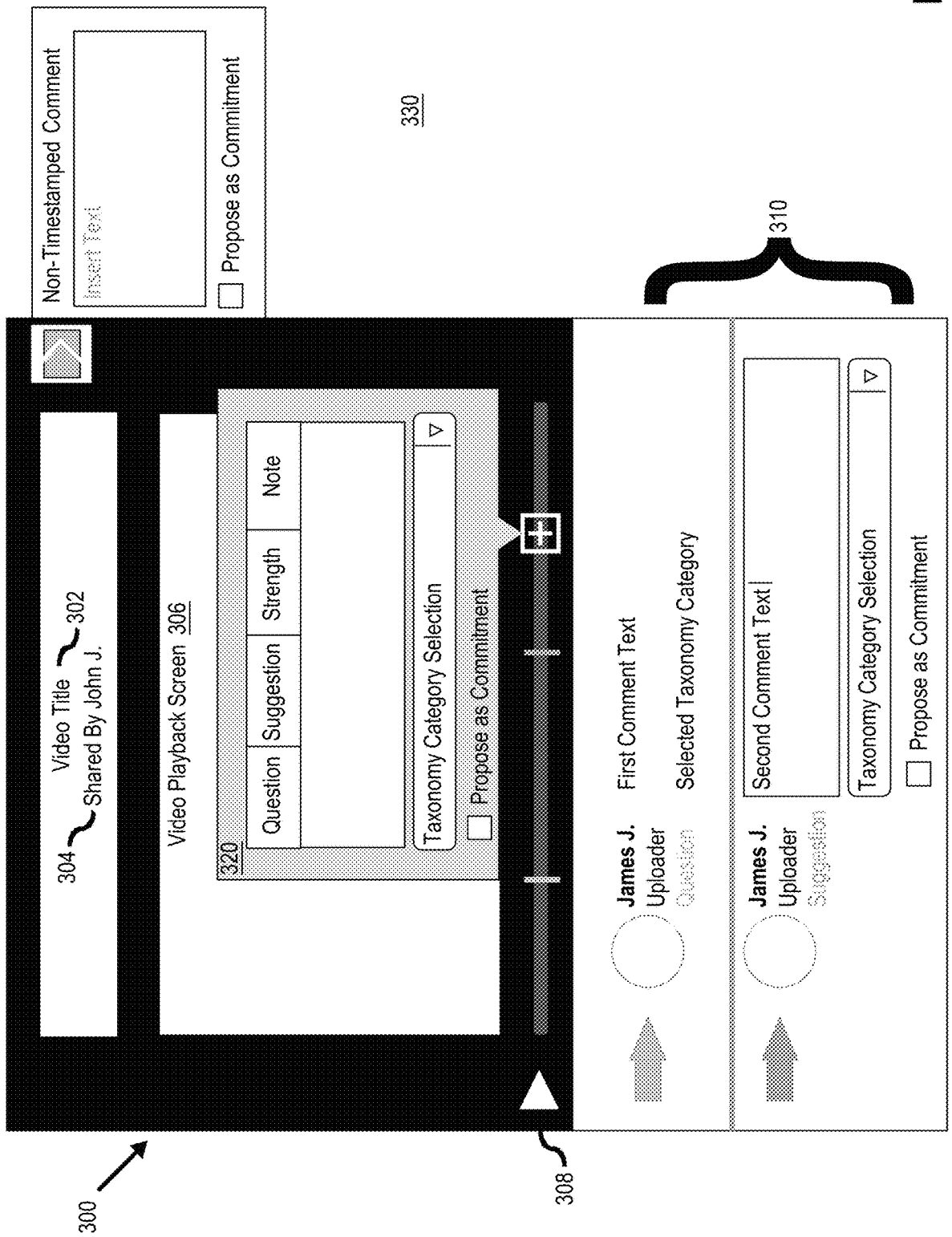
FIG. 3 illustrates an example screen display of a graphical user interface showing a video player window, options for generating comments, and options for generating task records.

FIG. 3 illustrates an example screen display of a graphical user interface showing a video player window, options for generating comments, and options for generating task records. While FIG. 3 depicts an interface for displaying video content, the systems and methods described herein may be performed with respect to different content items, such as audio or image items. Additionally, the systems and methods described herein may be applied to a set of content items, such as an interface displaying a plurality of video content items. Video playback interface 300 comprises video title 302, author data 304, video playback screen 306, and playback timeline 308. Video title 302 and author data 304 may be stored as content item metadata for a particular video and supplied to the video playback interface 300 when the particular video is selected. Playback timeline 308 comprises one or more playback controls and a timeline corresponding to a timeline of the video being displayed on video playback screen 306.

Video playback interface additionally includes three depicted locations including options for generating a task, including comments 310, timeline comment 320, and non-timestamped comment 330. Other embodiments may include other locations for generating a task. For example, a platform interface may include one or general elements, such as one or more menu options, and specific elements such as unique elements for a particular page or displayed content items. An option for generating a task may be included in the general elements of the platform interface. When the option is selected, the computer providing the platform interface may determine whether a content item is being displayed through the interface. If a content item is being displayed through the interface and/or is selected on the interface, the computer may utilize metadata from the content item in creating the task. Methods of creating the task are described further herein.

Comments 310 comprise one or more comments related to the video displayed on the video playback screen 306. Each comment may be related to a comment record, the comment record including comment input data, such as comment text, images, audio, or video data, commenter identification data, such as a username, a selected category of a taxonomy, a comment type, and/or a timestamp of the comment. In an embodiment, an option for generating a new comment is displayed on the interface, such as above existing comments or on an existing comment.

When a request to create a new comment is received, the interface may display one or more comment creation options. The comment creation options may include options to identify a comment type for a comment, options to select a taxonomy or category type of the taxonomy for the comment, options for specifying a location within a content item to which the comment relates, such as a physical location in an image or a temporal location in an audio or visual content item, and/or options for generating and/or uploading comment input data. The comment creation options may further comprise an option to generate a task from the comment. For example, in FIG. 3, a comment is in the process of being created, the creation options including an editable textbox for inserting comment text, a drop-down menu for specifying a category type of the taxonomy, and a selectable option for proposing the comment as a commitment. A commitment, as used in FIG. 3-8, refers to a task. When the computer receives data indicating completion of the comment, the computer may generate a comment record. If the selectable option for proposing the comment as a commitment is selected, the computer may additionally create a task record using data from the comment record and/or data used to create the comment record.

In an embodiment, the option to propose the comment as a commitment may be selectable from a comment that has already been created. For example, interface 300 may include a plurality of comments 310. In response to receiving a selection of a comment, the computer may cause display of an option to propose the comment as a commitment. In response to a selection of the option to propose the comment as a commitment, the computer may generate and store a task record using comment data.

In an embodiment, comments may be related to timestamps in the content item to which they relate. For example, in FIG. 3, each of the two displayed comments relates to a playback time of a corresponding video that displays on video playback screen 306. Two vertical lines on the timeline 308 indicate timestamps to which the two comments correspond. The different shades of the vertical lines correspond to different types of comments. For example, the lighter shade of the first comment and first timestamp correspond to a Question comment type while the darker shade of the second comment and second time stamp correspond to the Suggestion comment type.

In an embodiment, comments and tasks may be generated based on a selection of a timestamp in the playback timeline. Timeline comment 320 comprises a comment generation interface displayed in response to a selection of a timestamp on the playback timeline. The computer may convert the selected location on the playback timeline to a time within the video and store data identifying the time within the video with the comment record created from timeline comment 320. The interface of timeline comment 320 comprises options for identifying a comment type, inserting comment input data, selecting a category type of the taxonomy, and proposing the comment as a commitment. The computer may generate a comment record comprising the timestamp, the comment category, the comment input data, and/or the selected category type of the taxonomy. If the option to propose the comment as a commitment is selected, the computer may additionally generate a task record.

While timeline comment 320 depicts the creation of a task during the creation of the comment, the timeline may additionally be used to generate a task from an already created comment. For example, the computer may detect a location of a cursor on the video playback interface. When the location of the cursor overlaps with a vertical bar on the timeline that is associated with a comment, the computer may cause display of the comment in a similar manner as timeline comment 320 along with an option to propose the comment as a commitment. In response to a selection of the option to propose the comment as a commitment, the computer may generate a task record using data from the comment record associated with the comment.

Non-timestamped comment 330 comprises an interface for generating overall comments on the displayed content item. Unlike the other comments, the non-timestamped comment 330 comment is not related to a particular timestamp. While the interface for non-timestamped comment 330 only includes an editable textbox and option to propose the comment as commitment in FIG. 3, in other embodiments the interface for non-timestamped comment 330 additionally includes options to select a category type of the taxonomy and/or a comment type. In response to input in the interface for non-timestamped comment 330, the computer may generate a non-timestamped comment record. If the option to propose as a commitment is selected, the computer may additionally generate a task from the input data.

3.2 Generating a Task Record

In an embodiment, computer 102 generates a task record based on data related to a context in which a request to generate the task record is received. The context refers to a location of the selected option to generate a task record and/or a current display of the graphical user interface. Different contexts may include a general request to generate a task record, a request made when viewing a page relating to a particular user, a request made when viewing a page relating to a particular taxonomy and/or category type of the taxonomy, a request made when viewing particular content, a request made when viewing a particular content, and/or a request made from a location on a webpage relating to a user, taxonomy, category type of the taxonomy, content item, or comment.

For the purpose of providing a practical example, a website may include a plurality of subpages, such as pages relating to particular users, content items, taxonomies, taxonomy categories, comments, and/or comment threads. The website may additionally include one or more static elements that are displayed on each webpage, such as a navigation menu. The one or more static elements may include a request to generate a task. When a request to generate a task is received, computer 102 may determine a context of the request based on the displayed subpage on the requesting computer.

Based on the context, the computer 102 may populate one or more fields of a task record using metadata, subpage data, and/or data from a comment record. Populating the one or more fields of the task record may additionally include executing rules to determine which data to use and/or manipulating data from content metadata and/or the comment record before storing the manipulated data in a task record. Methods for generating the task record based on context is described further herein.

In an embodiment, the computer 102 determines context based on circumstances surrounding viewing of a content item. For example, computer 102 may store comment records which identify timestamps in a video content item to which the comment records relate. During playback of a video, a user may pause the video and select an option to create a new task. In response, the computer 102 may identify a current timestamp of the video. If the current timestamp of the video is not identified in any comment records, the computer 102 may identify a closest comment record as a comment record which comprises a timestamp closest in time to the current timestamp and/or prior to the current timestamp. Additionally and/or alternatively, if multiple comments are within a threshold value of the current timestamp, the computer 102 may display the multiple comments as options to the requesting computer, thereby allowing the requesting computer to establish a comment as context.

In an embodiment, the computer 102 identifies one or more comments as proposals for generating a task. For example, if the context of the request does not identify a specific comment, the computer 102 may execute one or more rules to identify comments to recommend as the context for the task. Example implementations may select comments based on a comment type, such as all suggestion comments, comments with a highest number of responses, or other filtering rules. Comments may be identified by an input context. For example, a graphical user interface may provide options for selecting a comment. In response to a selection of a comment type, the computer 102 may identify comments on the content item with the selected comment type. Additionally or alternatively, the computer 102 may identify comments on other content items associated with a same taxonomy, category of a taxonomy, author, and/or task requester.

In an embodiment, the computer 102 populates a field of the task record with data identifying a requester of the task. For example, the computer 102 may store profile data for a plurality of users. When a user provides authenticating input, the computer 102 may associate activity on the website with the user. When a request is received to generate a task, the computer 102 may determine that the request originated from an authenticated user. The computer 102 may then populate a field in the task record indicating that the request originated from the authenticated user.

In an embodiment, the computer 102 infers a title for the task record based on the context. For example, if the context includes a displayed content item, the title for the task may be based on the title for the displayed content item, such as "Based on [Video Name]". If the context includes a comment on a content item, data from the comment record, such as a category type of the taxonomy of the comment record, may be used to generate the title, such as "Working on [Taxonomy Category]". Similarly, if the context comprises the interface displaying information relating to a category type of the taxonomy, the category type of the taxonomy title may be used. If the context includes a labeled series of content items, the title may be generated from the labeled series of items, such as "Based on [Label Name]".

In an embodiment, the computer 102 executes one or more rules to determine which piece of data to use as a title. For example, a hierarchy may place emphasis on defined taxonomy categories over video titles. Thus, if the context of the request is a comment item, the computer 102 may determine whether the comment record for the comment item includes a taxonomy and/or a category type of the taxonomy. If so, the computer 102 may use the taxonomy and/or category type of the taxonomy in the comment record to create the title. If not, the computer 102 may determine whether the content item metadata for the content item related to the comment record includes a taxonomy and/or category type of the taxonomy. If so, the computer 102 may use the taxonomy and/or category type of the taxonomy from the content item metadata to create the title. If not, the computer 102 may use the title of the content item to create the title.

Generating the title may comprise manipulating one or more data sources. For example, a title generated from a comment may utilize both the commenter username and the title of the video, such as by inserting the commenter username and title of the video into the "Based on Comment by [username] on [VideoTitle]". Different phrases may also be used based on the source of the data used to create the title. For example, if the source is a category type of the taxonomy, the prefix of "Working on" may be added prior to the category type of the taxonomy while, if the source is a video title, the prefix of "Based on" may be added prior to the video title.

In an embodiment, the computer 102 infers a description for the task based on the context. For example, if the context of the request is a particular comment item, the computer may populate the description of the task record with the comment input data. For example, if the comment text reads "Leave more time after asking questions," the text may be copied into the description of the task record, thus causing the description in the task record to read "Leave more time after asking questions." If the context of the request is a content item, the computer 102 may generate the description for the task based on the content item. Additionally or alternatively, the description for the task may be left at a default value depending on the context of the request. Thus, if a request to generate a task is received with a neutral context, such as from a home page for the website, the description field of the task may be left blank or with a default value until additional task input is received.

Embodiments of populating the description field with the comment input data may be performed with audio, image, and/or audiovisual comments. For example, the description field may be populated with the audio, image, and/or audiovisual comment or a link to the audio, image, and/or audiovisual comment. Additionally or alternatively, the computer 102 may use transcription techniques to transcribe comment input data into text and populate the description field with the text of the comment. The transcription techniques may be employed at the computer 102 or at a separate computing system. For example, the computer 102 may send the comment input data to an external computing system which performs the transcription techniques and sends the transcription back to computer 102.

In an embodiment, the computer 102 infers a taxonomy and/or category of a taxonomy based on the context of the request. For example, if the context of the request is a comment item, the computer 102 may use the taxonomy and/or category of the taxonomy from the comment record. If the comment record does not include a taxonomy and/or category of a taxonomy, the computer 102 may determine whether the content item metadata includes a taxonomy and/or category of a taxonomy. If so, the taxonomy and/or category of the taxonomy from the content item metadata may be used. If not, the computer 102 may leave a default value in the taxonomy and/or category of a taxonomy field. The computer 102 may additionally use taxonomy and/or category of a taxonomy data from a displayed webpage. Thus, if the displayed webpage comprises metadata identifying a taxonomy and/or category of a taxonomy, the computer 102 may use the taxonomy and/or category of a taxonomy from the metadata.

In an embodiment, if a comment record does not include a category and/or taxonomy of a category, the category and/or taxonomy of a category of a different comment record is used. For example, the computer 102 may determine that the comment record that serves as context for the request to generate a task does not include a category type of the taxonomy. In response, the computer 102 may identify a related comment record, such as a referenced comment record or a most recent comment record. For example, if a comment record is generated as a reply to a different comment record, the computer 102 may identify the comment record that is the basis for the reply. The computer 102 may use the taxonomy or category of a taxonomy from the related record.

In an embodiment, if a comment record does not include a taxonomy and/or category of a taxonomy, the computer 102 may identify taxonomies and/or categories of a taxonomy based on the other comments on the content item as recommended taxonomies and/or categories of a taxonomy. For example, the computer 102 may identify taxonomies and/or categories of taxonomies for each other comment record relating to the content item. The computer 102 may identify the most frequently occurring taxonomies and/or categories of a taxonomy. The computer 102 may include in the task record recommendations of the most frequently occurring taxonomies and/or categories of a taxonomy. Additionally or alternatively, the computer 102 may identify most frequently used taxonomies or categories of a taxonomy from other tasks generally, other tasks for the content item creator, other content items for the content item creator, and/or other comments generally for use as recommended taxonomies or categories of a taxonomy.

In an embodiment, the computer 102 infers assignment of the task based on the context of the request. For example, if the context of the request is a comment on a content item, the computer 102 may identify an author of the content item based on data stored in the comment record and/or the content item metadata and assign the task to the author of the content item. Assigning the task to the author of the content item may include storing data in the task record identifying the author of the content item as the assignee of the task. Additionally, the computer 102 may cause display of the visual representation of the task on a computer associated with the assignee of the task. Thus, a first user may generate a content item. A second user may comment on the content item with a request to generate a task based on the comment. The computer may then generate a task record for the first user.

In an embodiment, the computer 102 infers sharing options based on the context of the request. For example, the computer 102 may identify any of the requester of the task, the author of a comment on which the task is based, or any users related to the assignee of the task, such as managing users. The computer 102 may store sharing data in the task record, thereby indicating which users have permission to view the task and/or progress on the task.

In an embodiment, the computer 102 includes one or more hyperlinks in the task record. The one or more hyperlinks may include links that, when selected, cause a computer to navigate to a page comprising a comment on which the task was based, a content item on which the task was based, and/or a webpage from which the request was made. Additionally or alternatively, the computer 102 may include either a content item or a pointer to a comment item in the task record, thereby allowing for display of the content item during display of the task.

3.3 Task Display and Editing

Figure 4:
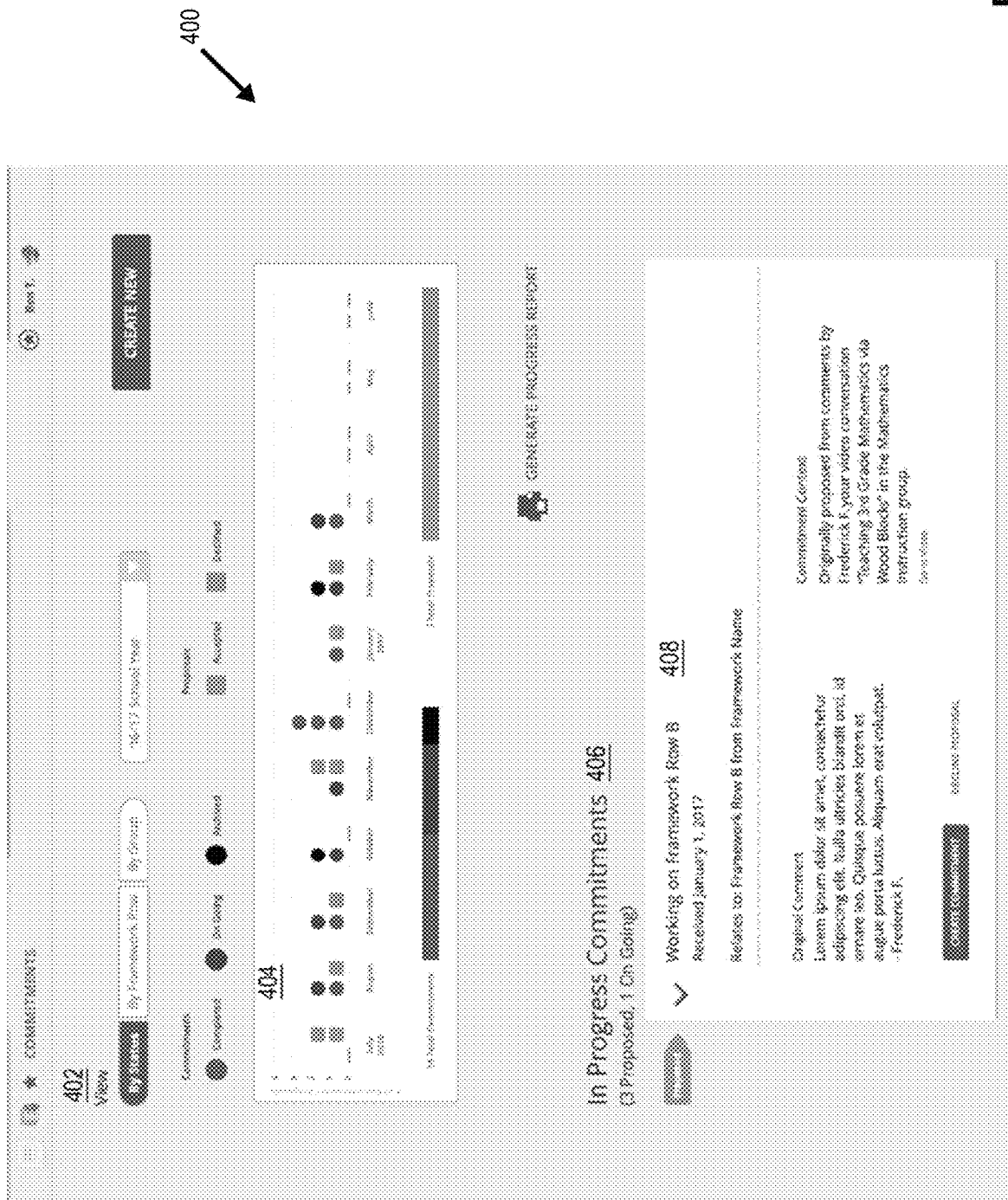
FIG. 4 illustrates an example display of a graphical user interface depicting generated task records and task record information.

FIG. 4 illustrates an example display of a graphical user interface depicting generated task records and task record information. Display 400 comprises an example display of tasks, including identification of the task, task types, and sorting options. Sorting options 402 include options for sorting view of tasks. In FIG. 4, tasks may be sorted by status, category of a taxonomy, or group of content items. Task statuses may include completed, on-going, archived, proposed and accepted, proposed and declined, or proposed and pending a response. Tasks may be displayed in a task timeline 404 which depicts tasks sorted based on sorting options 402 for a particular period of time. For example, task timeline 404 in FIG. 4 includes a completed task, an on-going task, and an accepted proposal for August of 2016.

Interface 400 additionally includes task list 406. Task list 406 may include proposed, completed, or on-going tasks for a particular user. For example, in FIG. 4, task list 406 includes three proposed tasks and one on-going task. Tasks may be grouped based on sorting options 402. For example, if status is selected, all proposed tasks may be grouped together. If framework row is selected, all tasks comprising identifiers of the same category of a taxonomy may be grouped together.

Task 408 comprises a proposed task generated in response to a request to generate a task based on a comment record. Task 408 includes data from the comment record and/or content item metadata. For instance, task 408 lists the category of the taxonomy "Framework Row B from Framework Name", the original comment, and the context of the task request. The context includes an identification of a comment, an identifier of the requester, a title of the content item, a grouping of content items to which the content item corresponds, and a hyperlink to the content item entitled "Go to Video". Additionally, task 408 includes an option to accept the task or delete the task. For instance, tasks may be generated as proposals by a party without the authority to require completion of a task, such as the person to whom the task is directed and/or a supervisor required to accept the proposal before the task is stored as an officially tracked task.

Figure 5:
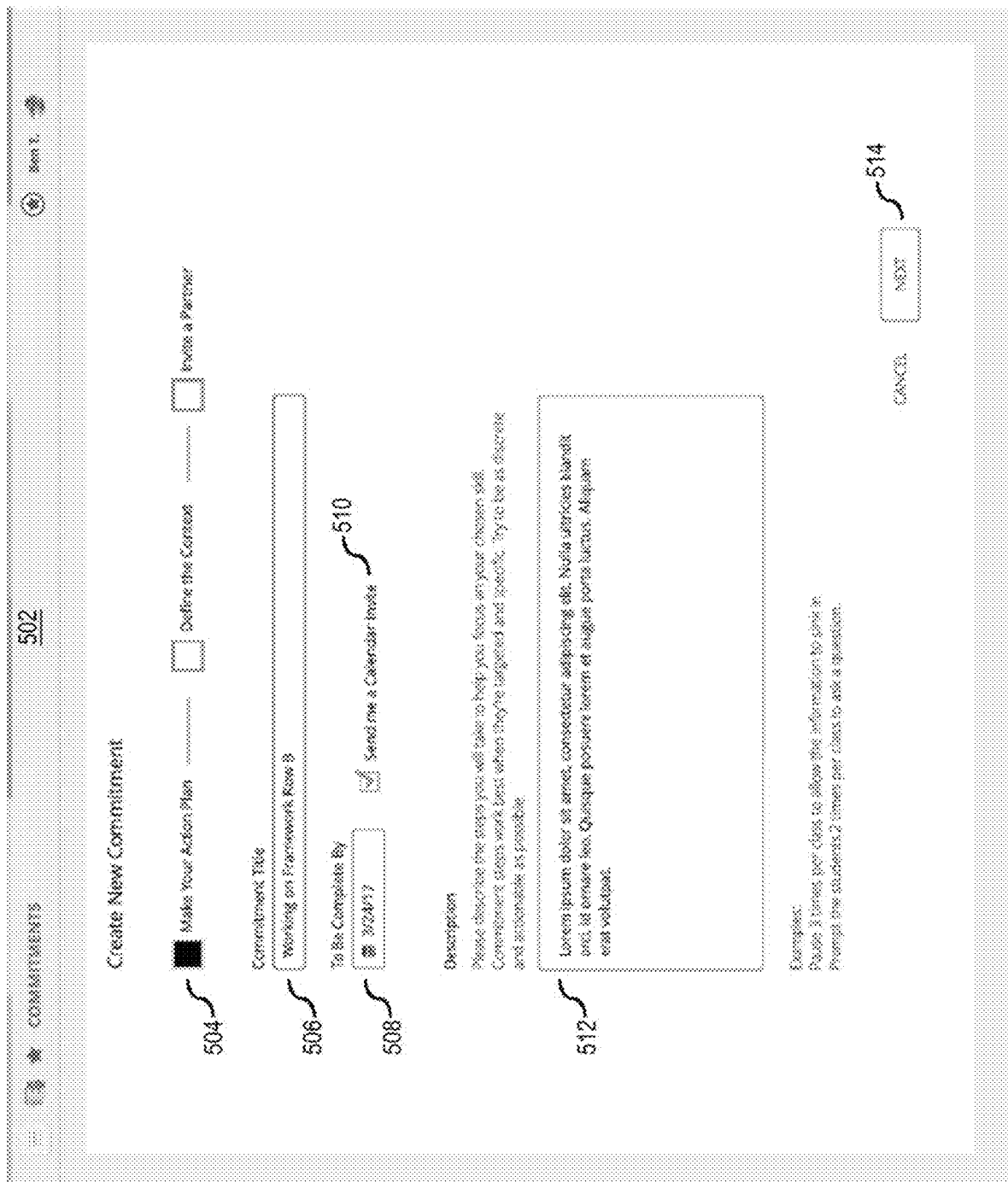
FIG. 5 illustrates an example display of a graphical user interface depicting options for completing a task with portions of the interface prepopulated based on a comment record from which the task record was created.

In an embodiment, the reviewer of the task may make changes to the task before accepting the task. FIG. 5 illustrates an example display of a graphical user interface depicting options for completing a task with portions of the interface prepopulated based on a comment record from which the task record was created. The completion of the task, as depicted in FIG. 5, FIG. 6, FIG. 7 includes three interfaces, one for generating the task, one for assigning the taxonomy and category of the taxonomy of the task, and one for setting access controls for the task.

In an embodiment, the screen display of FIG. 5 comprises a main window 502 having a progress bar 504, commitment title widget 506, completion date widget 508, calendar widget 510, description widget 512 and signal widget 514. In an embodiment, progress bar 504 comprises a graphical illustration of steps in a workflow involved in defining a task as represented in FIG. 5, FIG. 6, FIG. 7 and other displays. In an embodiment, commitment title widget 506 is programmed to receive input specifying a title of a commitment and, as noted below, may be pre-populated. In an embodiment, completion date widget 508 is programmed to receive input specifying a completion date, which also may be pre-populated as further described. In an embodiment, calendar widget 510 is programmed to receive a selection that specifies whether to automatically transmit a calendar item or invitation to the current user's account; in some embodiments, input checking the calendar widget 510 causes the system to transmit a calendar item as an e-mail attachment to the user account. In an embodiment, description widget 512 is programmed to receive input specifying a description of steps that the user plans to use to focus on a specified skill. In an embodiment, signal widget 514 is programmed to receive input specifying continuing the workflow and to store values specified in other widgets of main window 502 in a record as further described.

FIG. 5 includes prepopulated fields, including a prepopulated title and description. The title, as depicted in FIG. 5 is generated using the category of the taxonomy from the context of the request to generate the task as depicted in FIG. 4. Thus, as either the comment record or content item metadata identified a category of a taxonomy as Framework Row B, the task title is prepopulated with the category, "Framework Row B", and additional text based on the context of using a category type of the taxonomy for the title, "Working on". The description field is prepopulated with the comment input data from the originating comment record. Additionally, options for setting a date by which to complete the task and generating a calendar invite for the input date are displayed in FIG. 5.

Figure 6:
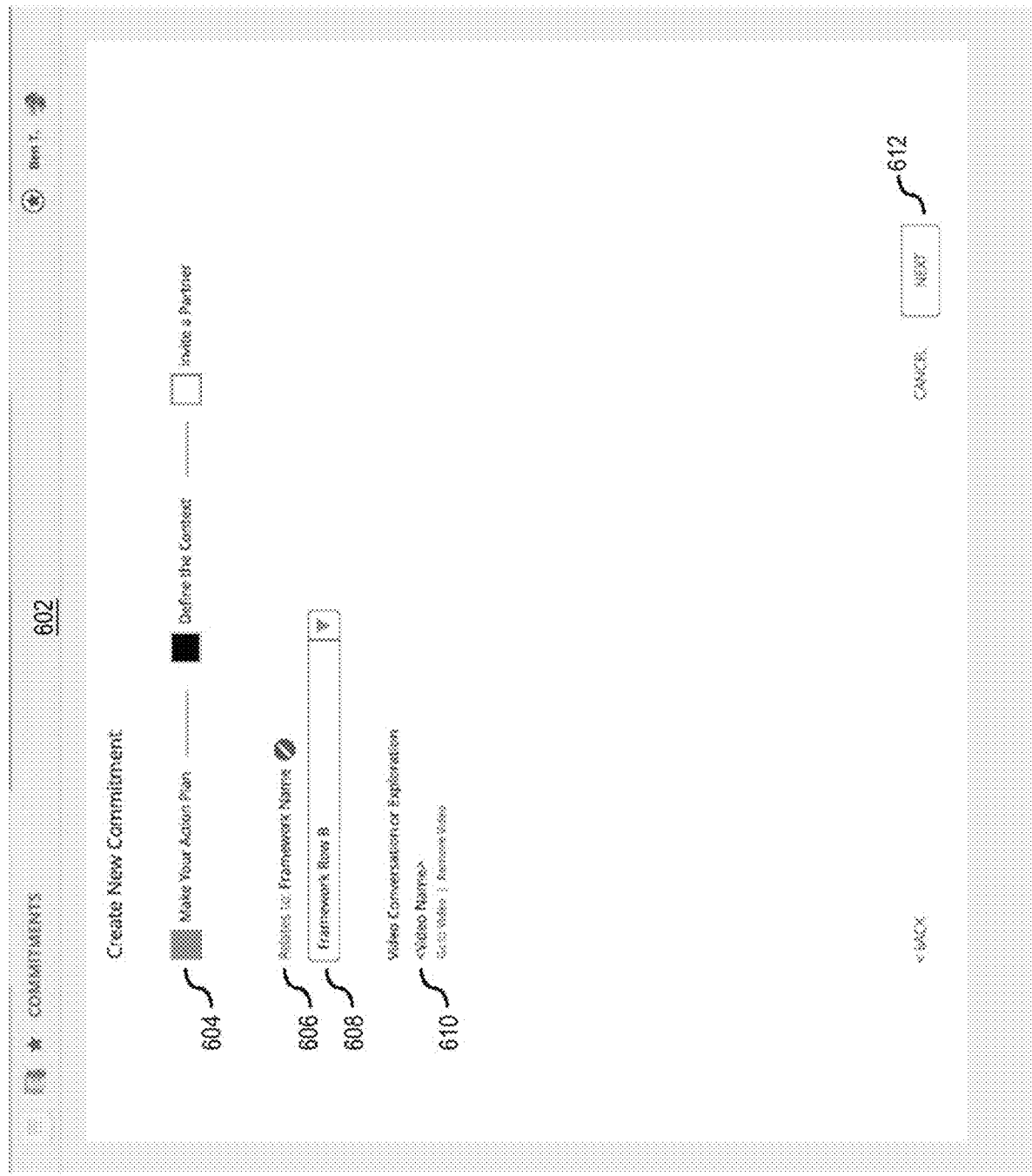
FIG. 6 illustrates an example display of a graphical user interface depicting options for completing a task comprising options for specifying an identifier of a taxonomy.
Figure 7:
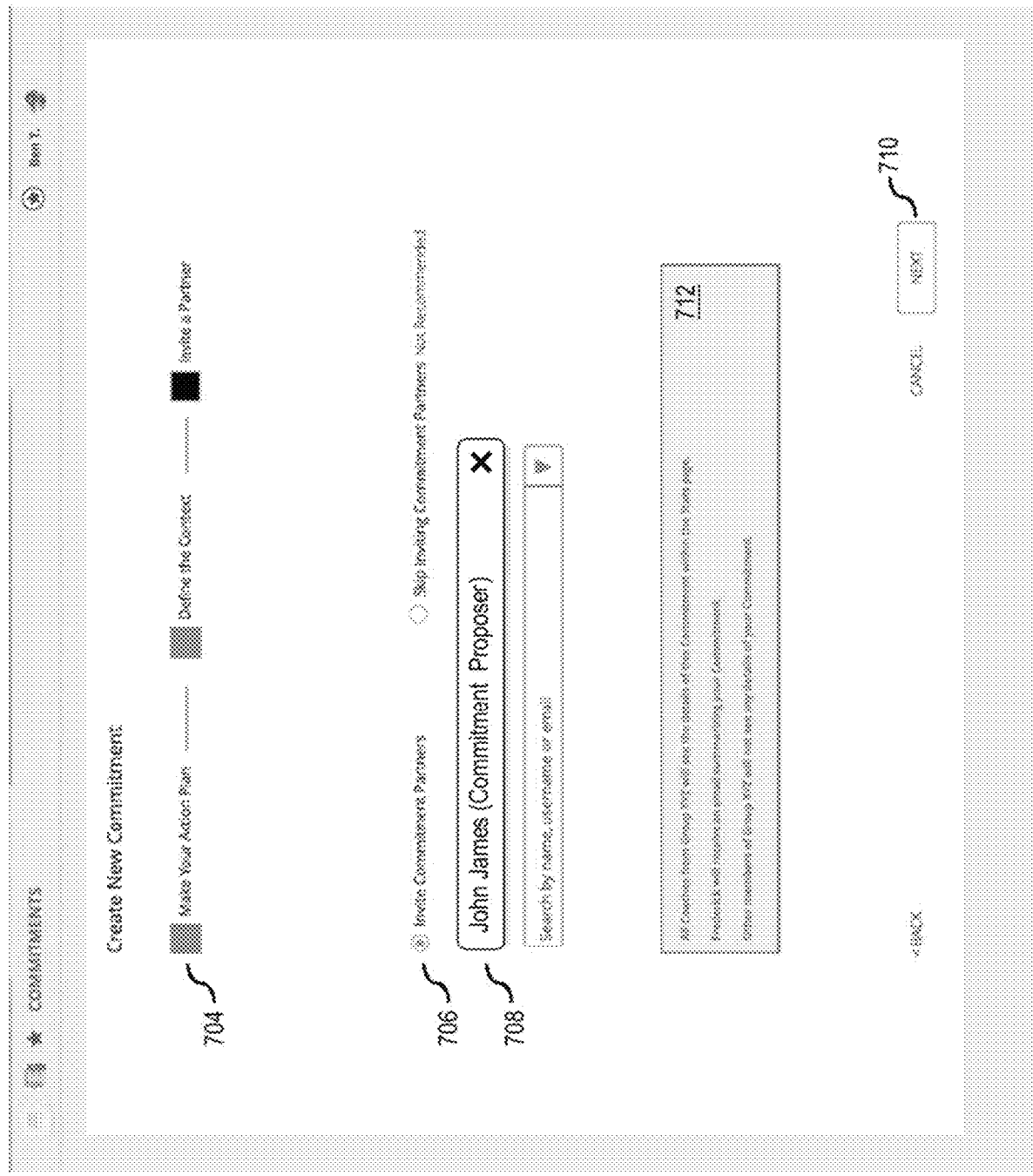
FIG. 7 illustrates an example display of a graphical user interface depicting options for completing a task comprising options for specifying sharing access controls for the task.

FIG. 6 illustrates an example display of a graphical user interface depicting options for completing a task comprising options for specifying an identifier of a taxonomy. In an embodiment, FIG. 6 comprises a main window 602 having a progress bar 604, a taxonomy widget 606, a category type of the taxonomy widget 608, a content item widget 610, and a signal widget 612. In an embodiment, progress bar 504 comprises a graphical illustration of steps in a workflow involved in defining a task as represented in FIG. 5, FIG. 6, FIG. 7 and other displays. In an embodiment, taxonomy widget 606 is programmed to receive input specifying a taxonomy; in some embodiments, input into taxonomy widget 606 causes the system to populate options for category type of the taxonomy widget 608 with categories of the input taxonomy. In an embodiment, category type of the taxonomy widget 608 is programmed to receive input specifying a category of a taxonomy. In an embodiment, content item widget 610 is programmed to receive input specifying a content item. Content item widget 610 may additionally cause display of the content item or a link to the content item. Any of widgets 606-610 may be prepopulated as described further herein. In an embodiment, signal widget 612 is programmed to receive input specifying continuing the workflow and to store values specified in other widgets of main window 602 in a record as further described.

Using the interface of FIG. 6, the task reviewer may set a taxonomy in the "Relates to" field. In an embodiment, the drop-down menu is auto-populated with categories of the taxonomy selected in the above field. The interface additionally includes options for identifying a content item on which the task is based. Depending on the context of the request to generate the task, the taxonomy, category of the taxonomy, and content item information may be pre-filled using data from a comment record and/or content item metadata.

FIG. 7 illustrates an example display of a graphical user interface depicting options for completing a task comprising options for specifying sharing access controls for the task. In an embodiment, FIG. 7 comprises a main window 702 having a progress bar 704, invite widget 706, user identifier widget 708, signal widget 710, and context-based visibility data 712. In an embodiment, progress bar 704 comprises a graphical illustration of steps in a workflow involved in defining a task as represented in FIG. 5, FIG. 6, FIG. 7 and other displays. In an embodiment, invite widget is programmed to receive input indicating whether other users should be added to the task; in some embodiments, user identifier widget 708 is only displayed if an option to add other users to the task is selected. In an embodiment, user identifier widget 708 is programmed to receive input identifying users to be added to or removed from the task. User identifier widget 708 may be prepopulated as described further herein. In an embodiment, signal widget 710 is programmed to receive input specifying continuing the workflow and to store values specified in other widgets of main window 702 in a record as further described.

In the interface of FIG. 7, options for identifying users for specifying sharing access controls are displayed. The interface may automatically include recommendations to provide access to the task to the proposer of the task, a supervisor of the recipient of the task, and/or identifiers of other users who had previously been included in the sharing options of prior tasks for the recipient of the task. Additionally, the search function of FIG. 7 allows a user to look up and select other users with whom the task is to be shared.

Context-based visibility data identifies access control options based on the context of the request to generate the task. For example, if a task is created for a video within a group of videos generated by other users, the other users may be given access to view the task generated for the video. Additionally or alternatively, if a specific user is selected as a coach for a content item, group of content items, user, or group of users, the specific user may have access to details of the task.

In an embodiment, an interface may include a plurality of options for one or more aspects of a task based on the context of the request for the task and/or one or more other factors.

Figure 8:
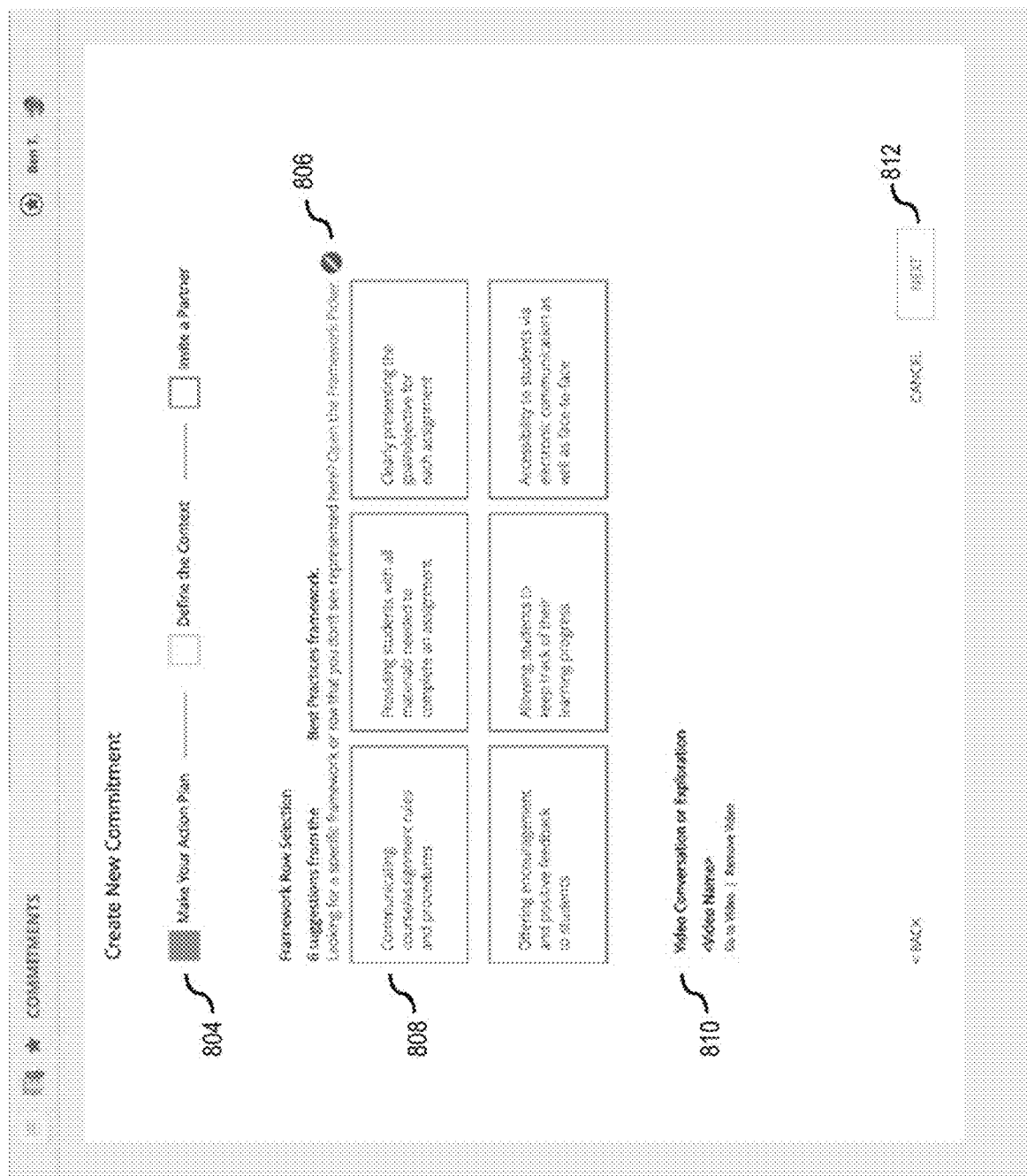
FIG. 8 illustrates an example display of a graphical user interface depicting options for completing a task comprising suggested categories within a taxonomy.

FIG. 8 illustrates an example display of a graphical user interface depicting options for completing a task comprising suggested categories within a taxonomy. In an embodiment, FIG. 8 comprises a main window 802 having a progress bar 804, a taxonomy widget 806, a category type of the taxonomy widget 808, a content item widget 810, and a signal widget 812. In an embodiment, progress bar 804 comprises a graphical illustration of steps in a workflow involved in defining a task as represented in FIG. 8, FIG. 5, FIG. 7 and other displays. In an embodiment, taxonomy widget 806 is programmed to receive input specifying a taxonomy. In an embodiment, category type of the taxonomy widget 808 is programmed to receive input specifying a category of a taxonomy. Category type of the taxonomy widget 808 may be configured to display recommended categories of a taxonomy based on a selected taxonomy and one or more additional factors. In an embodiment, content item widget 810 is programmed to receive input specifying a content item. Content item widget 810 may additionally cause display of the content item or a link to the content item. In an embodiment, signal widget 812 is programmed to receive input specifying continuing the workflow and to store values specified in other widgets of main window 802 in a record as further described.

In FIG. 8, the taxonomy of "Best Practices" has been selected, either through the interface of FIG. 8 or based on comment records or content item metadata. As a category of the taxonomy has not been selected, FIG. 8 includes recommendations of categories within the selected taxonomy. As describe in Section 3.2, the suggestions may be based on different comment records for the same content item, different comment records for other content items, frequent selections of categories in the framework by the recipient of the task, and/or frequent selections of categories in the framework by one or more other users.

Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 9:
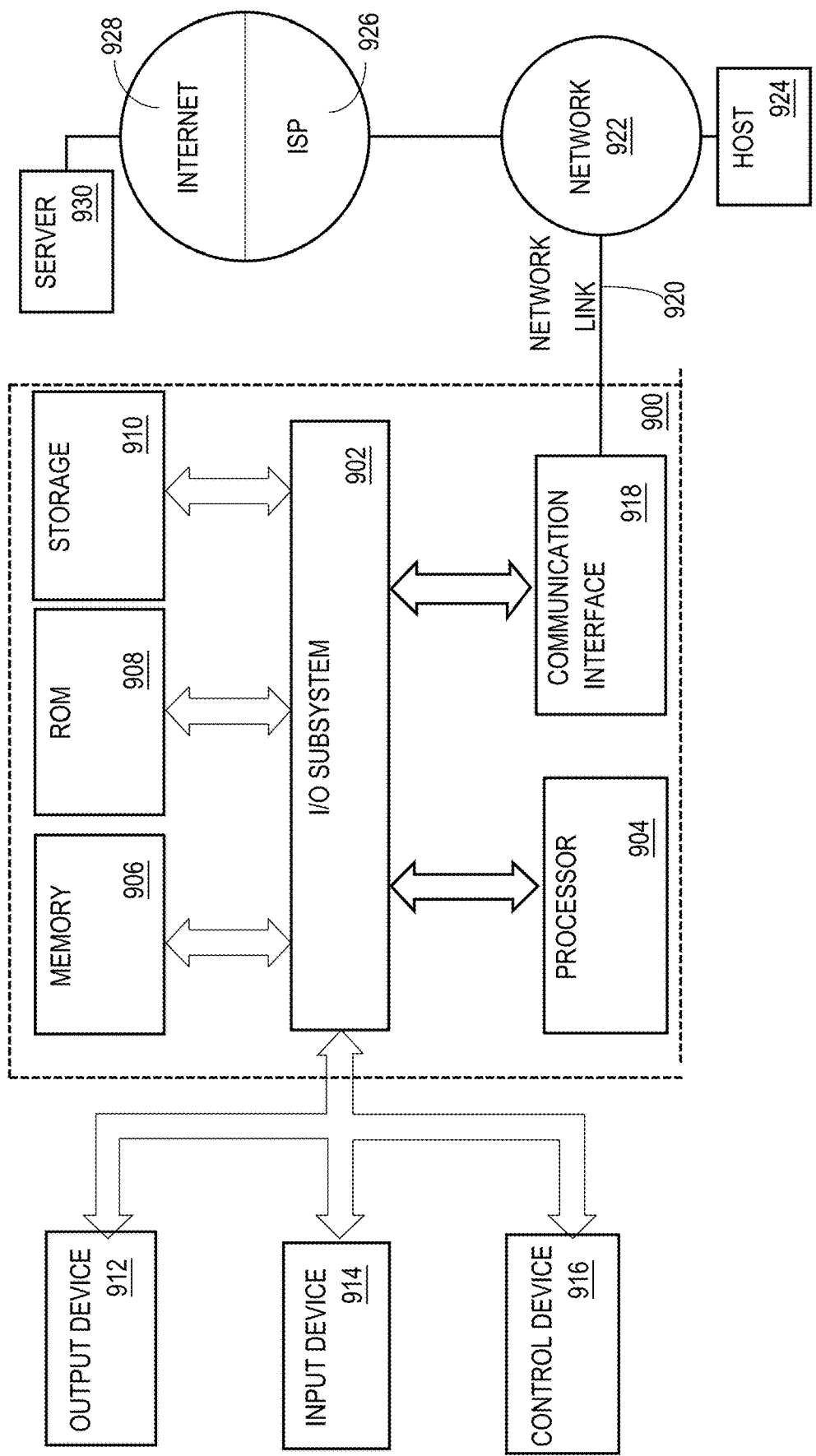
FIG. 9 illustrates an example computer system with which an embodiment may be implemented.

FIG. 9 is a block diagram that illustrates an example computer system with which an embodiment may be implemented. In the example of FIG. 9, a computer system 900 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 900 includes an input/output (I/O) subsystem 902 which may include a bus and/or other communication mechanism(s) for communicating information and/or instructions between the components of the computer system 900 over electronic signal paths. The I/O subsystem 902 may include an I/O controller, a memory controller and at least one I/O port. The electronic signal paths are represented schematically in the drawings, for example as lines, unidirectional arrows, or bidirectional arrows.

At least one hardware processor 904 is coupled to I/O subsystem 902 for processing information and instructions. Hardware processor 904 may include, for example, a general-purpose microprocessor or microcontroller and/or a special-purpose microprocessor such as an embedded system or a graphics processing unit (GPU) or a digital signal processor or ARM processor. Processor 904 may comprise an integrated arithmetic logic unit (ALU) or may be coupled to a separate ALU.

Computer system 900 includes one or more units of memory 906, such as a main memory, which is coupled to I/O subsystem 902 for electronically digitally storing data and instructions to be executed by processor 904. Memory 906 may include volatile memory such as various forms of random-access memory (RAM) or other dynamic storage device. Memory 906 also may be used for storing temporary variables or other intermediate information during execution of instructions to be executed by processor 904. Such instructions, when stored in non-transitory computer-readable storage media accessible to processor 904, can render computer system 900 into a special-purpose machine that is customized to perform the operations specified in the instructions.

Computer system 900 further includes non-volatile memory such as read only memory (ROM) 908 or other static storage device coupled to I/O subsystem 902 for storing information and instructions for processor 904. The ROM 908 may include various forms of programmable ROM (PROM) such as erasable PROM (EPROM) or electrically erasable PROM (EEPROM). A unit of persistent storage 910 may include various forms of non-volatile RAM (NVRAM), such as FLASH memory, or solid-state storage, magnetic disk or optical disk such as CD-ROM or DVD-ROM, and may be coupled to I/O subsystem 902 for storing information and instructions. Storage 910 is an example of a non-transitory computer-readable medium that may be used to store instructions and data which when executed by the processor 904 cause performing computer-implemented methods to execute the techniques herein.

The instructions in memory 906, ROM 908 or storage 910 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG, WebM, GIF or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 900 may be coupled via I/O subsystem 902 to at least one output device 912. In one embodiment, output device 912 is a digital computer display. Examples of a display that may be used in various embodiments include a touch screen display or a light-emitting diode (LED) display or a liquid crystal display (LCD) or an e-paper display. Computer system 900 may include other type(s) of output devices 912, alternatively or in addition to a display device. Examples of other output devices 912 include printers, ticket printers, plotters, projectors, sound cards or video cards, speakers, buzzers or piezoelectric devices or other audible devices, lamps or LED or LCD indicators, haptic devices, actuators or servos.

At least one input device 914 is coupled to I/O subsystem 902 for communicating signals, data, command selections or gestures to processor 904. Examples of input devices 914 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 916, which may perform cursor control or other automated control functions such as navigation in a graphical interface on a display screen, alternatively or in addition to input functions. Control device 916 may be a touchpad, a mouse, a trackball, or cursor direction keys for communicating direction information and command selections to processor 904 and for controlling cursor movement on display 912. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 914 may include a combination of multiple different input devices, such as a video camera and a depth sensor.

In another embodiment, computer system 900 may comprise an internet of things (IoT) device in which one or more of the output device 912, input device 914, and control device 916 are omitted. Or, in such an embodiment, the input device 914 may comprise one or more cameras, motion detectors, thermometers, microphones, seismic detectors, other sensors or detectors, measurement devices or encoders and the output device 912 may comprise a special-purpose display such as a single-line LED or LCD display, one or more indicators, a display panel, a meter, a valve, a solenoid, an actuator or a servo.

When computer system 900 is a mobile computing device, input device 914 may comprise a global positioning system (GPS) receiver coupled to a GPS module that is capable of triangulating to a plurality of GPS satellites, determining and generating geo-location or position data such as latitude-longitude values for a geophysical location of the computer system 900. Output device 912 may include hardware, software, firmware and interfaces for generating position reporting packets, notifications, pulse or heartbeat signals, or other recurring data transmissions that specify a position of the computer system 900, alone or in combination with other application-specific data, directed toward host 924 or server 930.

Computer system 900 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 900 in response to processor 904 executing at least one sequence of at least one instruction contained in main memory 906. Such instructions may be read into main memory 906 from another storage medium, such as storage 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 910. Volatile media includes dynamic memory, such as memory 906. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 902. Transmission media can also take the form of acoustic or light waves, such as those generated during radio-wave and infra-red data communications.

Various forms of media may be involved in carrying at least one sequence of at least one instruction to processor 904 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 900 can receive the data on the communication link and convert the data to a format that can be read by computer system 900. For instance, a receiver such as a radio frequency antenna or an infrared detector can receive the data carried in a wireless or optical signal and appropriate circuitry can provide the data to I/O subsystem 902 such as place the data on a bus. I/O subsystem 902 carries the data to memory 906, from which processor 904 retrieves and executes the instructions. The instructions received by memory 906 may optionally be stored on storage 910 either before or after execution by processor 904.

Computer system 900 also includes a communication interface 918 coupled to bus 902. Communication interface 918 provides a two-way data communication coupling to network link(s) 920 that are directly or indirectly connected to at least one communication networks, such as a network 922 or a public or private cloud on the Internet. For example, communication interface 918 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 922 broadly represents a local area network (LAN), wide-area network (WAN), campus network, internetwork or any combination thereof. Communication interface 918 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 918 sends and receives electrical, electromagnetic or optical signals over signal paths that carry digital data streams representing various types of information.

Network link 920 typically provides electrical, electromagnetic, or optical data communication directly or through at least one network to other data devices, using, for example, satellite, cellular, Wi-Fi, or BLUETOOTH technology. For example, network link 920 may provide a connection through a network 922 to a host computer 924.

Furthermore, network link 920 may provide a connection through network 922 or to other computing devices via internetworking devices and/or computers that are operated by an Internet Service Provider (ISP) 926. ISP 926 provides data communication services through a world-wide packet data communication network represented as internet 928. A server computer 930 may be coupled to internet 928. Server 930 broadly represents any computer, data center, virtual machine or virtual computing instance with or without a hypervisor, or computer executing a containerized program system such as DOCKER or KUBERNETES. Server 930 may represent an electronic digital service that is implemented using more than one computer or instance and that is accessed and used by transmitting web services requests, uniform resource locator (URL) strings with parameters in HTTP payloads, API calls, app services calls, or other service calls. Computer system 900 and server 930 may form elements of a distributed computing system that includes other computers, a processing cluster, server farm or other organization of computers that cooperate to perform tasks or execute applications or services. Server 930 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG, WebM, GIF or PNG;

user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 930 may comprise a web application server that hosts a presentation layer, application layer and data storage layer such as a relational database system using structured query language (SQL) or no SQL, an object store, a graph database, a flat file system or other data storage.

Computer system 900 can send messages and receive data and instructions, including program code, through the network(s), network link 920 and communication interface 918. In the Internet example, a server 930 might transmit a requested code for an application program through Internet 928, ISP 926, local network 922 and communication interface 918. The received code may be executed by processor 904 as it is received, and/or stored in storage 910, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 904. While each processor 904 or core of the processor executes a single task at a time, computer system 900 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

What is claimed is:

1. A data processing method comprising:
    a first computer obtaining access to a digitally stored content item, the content item being stored with content item metadata identifying one or more of a creator of the content item, a title of the content item, description of the content item, content type of the content item, sharing settings of the content item, a taxonomy of the content item, or a category type of the taxonomy of the content item;
    storing, at the first computer, a comment record comprising an identifier of the content item and comment input data;
    causing displaying, on a third computer, the content item and a comment item comprising the comment input data and an option to generate a task for the creator of the content item from the comment item;
    receiving, at the first computer, a selection of the option to generate the task for the creator of the content item from the comment item and, in response, generating and storing a task record based, at least in part, on the content item metadata, the task record comprising an identifier of the task and the identifier of the content item and the comment input data from the comment item;
    causing display, on a second computer, a graphical representation of the task based, at least in part, on the task record;
    wherein the method is performed using one or more processors.

2. The method of claim 1, further comprising:
    storing, in the comment record, an identifier of a taxonomy for the comment item;
    in response to the identifier of the taxonomy for the comment item being stored in the comment record, storing the identifier of the taxonomy for the comment item in the task record.

3. The method of claim 2 wherein the taxonomy is any of a framework and a rubric configured for use in evaluating an effectiveness of an educator.

4. The method of claim 2, further comprising:
    storing, in the comment record, a category type of the taxonomy for the particular comment item;
    in response to the category type of a taxonomy for the particular comment item being stored in the first record, storing the category type of the taxonomy for the particular comment item in the task record.

5. The method of claim 1, further comprising:
    determining that the comment record does not comprise data identifying a category type of a taxonomy for the particular comment item;
    identifying a second comment record comprising an identifier of the content item and a particular category type of a taxonomy for the second comment item;
    in response to the comment record not comprising data identifying a category type of a taxonomy for the particular content item, storing the particular category type for the second comment item in the task record.

6. The method of claim 1, wherein generating the task record comprises:
    executing one or more rules to identify data from one or more of the content item metadata or the comment record for populating one or more fields in the task record;
    populating the one or more field in the task record with the identified data;
    manipulating the data in the one or more fields for display in the graphical representation of the task on the second computing device or for storage in the task record.

7. The method of claim 6:
    wherein executing the one or more rules to identify data from one or more of the content item metadata or the comment record comprises:
        determining whether the comment record comprises a category type of a taxonomy for the particular comment item;
        in response to determining that the comment record comprises a category type, selecting the category type from the comment record for a title data field of the task record;
        in response to determining that the comment record does not comprise a category type of a taxonomy, determining whether the content item metadata comprises a category type of a taxonomy for the particular content item;
in response to determining that the content item metadata comprises a category type, selecting the category type from the content item metadata for the title data field;
in response to determining that the content item metadata does not comprise a category type, selecting a title of the content item from the content item metadata as for the title data field;
wherein manipulating the data in the one or more fields comprises generating a title based on the title data field and a source of data in the title data field.

8. The method of claim 1, further comprising:
causing displaying, on the second computer, a task generation interface comprising a plurality of editable options;
prepopulating one or more of the plurality of editable options with the comment input data and the identifier of the content item;
receiving additional task input data and a request to generate the task from the second computer and, in response, generating and storing the task record, the task record additionally comprising the additional task input data.

9. The method of claim 8, further comprising:
determining that the comment record does not comprise data identifying a category type of a taxonomy for the particular comment item;
identifying a plurality of second comment records comprising an identifier of the content item, comment input data for a plurality of second comment items, and a plurality of taxonomies or category types of a taxonomy for the plurality of second comment items;
displaying, in the task generation interface, a plurality of selectable options, each of which corresponding to a taxonomy of the plurality of taxonomies or category type of the plurality of category types of the taxonomy;
receiving a selection of a particular selectable option corresponding to a particular taxonomy and category type and, in response, storing the taxonomy and category type of the taxonomy for the particular comment item in the task record.

10. The method of claim 1, wherein the comment input data comprises any of text, image, a video resource or video file, or an audio resource or audio file.

11. A computer system comprising:
one or more processors;
a memory storing instructions which, when executed by the one or more processors, cause performance of:
obtaining access to a digitally stored content item, the content item being stored with content item metadata identifying one or more of a creator of the content item, a title of the content item, description of the content item, content type of the content item, sharing settings of the content item, a taxonomy of the content item, or a category type of the taxonomy of the content item;
storing a comment record comprising an identifier of the content item and comment input data;
causing displaying the content item and a comment item comprising the comment input data and an option to generate a task for the creator of the content item from the comment item;
receiving a selection of the option to generate the task for the creator of the content item from the comment item and, in response, generating and storing a task record based, at least in part, on the content item metadata, the task record comprising an identifier of the task and the identifier of the content item; causing display of a graphical representation of the task based, at least in part, on the task record.

12. The system of claim 11, wherein the instructions, when executed by the one or more processors, further cause performance of:
storing, in the comment record, an identifier of a taxonomy for the comment item;
in response to the identifier of the taxonomy for the comment item being stored in the comment record, storing the identifier of the taxonomy for the comment item in the task record.

13. The system of claim 12 wherein the taxonomy is any of a framework and a rubric configured for use in evaluating an effectiveness of an educator.

14. The system of claim 12, wherein the instructions, when executed by the one or more processors, further cause performance of:
storing, in the comment record, a category type of the taxonomy for the particular comment item;
in response to the category type of the taxonomy for the particular comment item being stored in the first record, storing the category type of the taxonomy for the particular comment item in the task record.

15. The system of claim 11, wherein the instructions, when executed by the one or more processors, further cause performance of:
determining that the comment record does not comprise data identifying a category type of a taxonomy for the particular comment item;
identifying a second comment record comprising an identifier of the content item and a particular category type of a taxonomy for the second comment item;
in response to the comment record not comprising data identifying a category type of a taxonomy for the particular content item, storing the particular category type for the second comment item in the task record.

16. The system of claim 11, wherein generating the task record comprises:
executing one or more rules to identify data from one or more of the content item metadata or the comment record for populating one or more fields in the task record;
populating the one or more field in the task record with the identified data;
manipulating the data in the one or more fields for display in the graphical representation of the task on the second computing device or for storage in the task record.

17. The system of claim 16:
wherein executing the one or more rules to identify data from one or more of the content item metadata or the comment record comprises:
determining whether the comment record comprises a category type of a taxonomy for the particular comment item;
in response to determining that the comment record comprises a category type, selecting the category type from the comment record for a title data field of the task record;
in response to determining that the comment record does not comprise a category type of a taxonomy, determining whether the content item metadata comprises a category type of a taxonomy for the particular content item;

in response to determining that the content item metadata comprises a category type, selecting the category type from the content item metadata for the title data field;

in response to determining that the content item metadata does not comprise a category type, selecting a title of the content item from the content item metadata as for the title data field;

wherein manipulating the data in the one or more fields comprises generating a title based on the title data field and a source of data in the title data field.

18. The system of claim 11, wherein the instructions, when executed by the one or more processors, further cause performance of:

causing displaying a task generation interface comprising a plurality of editable options;

prepopulating one or more of the plurality of editable options with the comment input data and the identifier of the content item;

receiving additional task input data and a request to generate the task from the second computer and, in response, generating and storing the task record, the task record additionally comprising the additional task input data.

19. The system of claim 18, wherein the instructions, when executed by the one or more processors, further cause performance of:

determining that the comment record does not comprise data identifying a category type of a taxonomy for the particular comment item;

identifying a plurality of second comment records comprising an identifier of the content item, comment input data for a plurality of second comment items, and a plurality of taxonomies or category types of a taxonomy for the plurality of second comment items;

displaying, in the task generation interface, a plurality of selectable options, each of which corresponding to a taxonomy of the plurality of taxonomies or category type of the plurality of category types of the taxonomy;

receiving a selection of a particular selectable option corresponding to a particular taxonomy and category type and, in response, storing the taxonomy and category type of the taxonomy for the particular comment item in the task record.

20. The system of claim 11 wherein receiving the comment input data comprises any of text, image, a video resource or video file, or an audio resource or audio file.

\* \* \* \* \*